$$E_{(REF)} \times \frac{R_{64}+R_{66}}{R_{66}}$$

INVENTOR.
CLYDE M. WHITBY
ROBERT R. FONTAINE
BY
Donald P. Smith
ATTORNEY

March 27, 1962   C. M. WHITBY ETAL   3,026,631
AIRCRAFT TRAINER WITH PHASE SELECTOR AND LIMITER
Filed July 29, 1958                                      3 Sheets-Sheet 3

INVENTOR.
CLYDE M. WHITBY
ROBERT R. FONTAINE
BY
Donald P. Smith
ATTORNEY

United States Patent Office 3,026,631
Patented Mar. 27, 1962

3,026,631
AIRCRAFT TRAINER WITH PHASE
SELECTOR AND LIMITER
Clyde M. Whitby, Beltsville, and Robert R. Fontaine, East Riverdale, Md., assignors to ACF Industries, Incorporated, New York, N.Y., a corporation of New Jersey
Filed July 29, 1958, Ser. No. 751,766
6 Claims. (Cl. 35—12)

This invention relates to a phase selector and limiter circuit, usable particularly in grounded aircraft simulators for training personnel.

In an actual aircraft a spoiler is provided on each wing to spoil or reduce the aerodynamic lift of the wing by changing its surface. It usually consists of a flap which is movable to form an angle with the upper plane of the wing, which flap deflects the airflow and reduces the lift of the wing. If the spoiler on a single wing is raised the plane will develop a roll because of the lift differential between wings. If the spoilers on both wings are raised, the forward velocity of the craft is reduced and the plane is, in effect, braked in the air. At high velocities the pressure of the air against the spoiler surface tends to blow them down into their retracted position, and in most aircraft there is no positive locking device to hold the spoilers in the extended position and when the aerodynamic pressure against the surface exceeds the hydraulic pressure tending to keep the surface extended, then the spoiler will partly be blown into its retracted position.

In a grounded aircraft trainer the student pilot has at his disposal a control wheel and a speed brake handle; as in the actual aircraft turning the control wheel raises one or the other of the spoilers to simulate the raising of one or the other of the spoilers and thus change the aerodynamic characteristics of the simulated flight. Pulling the speed brake handle simulates the raising of all of the spoilers. As will later be more fully explained manipulation of these controls in a simulator by the pilot derives voltages which operate a position servomechanism having a shaft whose position represents the position of the spoilers and potentiometers are connected mechanically to the shaft to derive voltages proportional to the shaft position which voltages are usable in the aerodynamic computers whereby the various gages within the field of vision of the student pilot indicate to him that a change in simulated flight has occurred. Other computers which derive voltages proportional to functions of Mach number and altitude are connected into the servo system to provide an answer voltage tending to drive the servo motor shaft into the simulated spoiler blowdown position as the aircraft velocity increases. Thus, there is created an unbalance in the system wherein the normal servo answer voltage tends to reposition the shaft in accordance with the position of the manual controls handled by the pilot as opposed to the forced shaft position created by the simulated high aircraft velocity. Since in an actual aircraft the spoiler restoring force hydraulic pressure is necessarily limited; so must the restoring force be limited in the simulator, and a novel circuit is provided which, at once, selects the proper phase or sense of the input voltage and limits its amplitude to a predetermined value and which is interposed between the input circuit and the servo mechanism to thereby realistically simulated spoiler restoring force with aircraft limited hydraulic capacity.

It is, accordingly a broad object of this invention to provide a circuit for simulating to a student pilot the aerodynamic loading of aircraft spoilers.

It is a more distinct object of this invention to provide a grounded aircraft trainer having a simulated spoiler system movable in accordance with controls available to a student pilot and further movable in accordance with functions of aircraft velocity and altitude.

It is a more distinct object of this invention to provide a simulated aircraft spoiler system wherein the restoring force of the manual control operating against aerodynamic blowdown is limited by an electrical circuit in simulation of limited hydraulic system capacity in an actual aircraft.

It is a further object of this invention to provide a phase selector and limiter circuit for use in a grounded aircraft trainer.

It is a still further object of this invention to provide a phase selector and limiter which produces an undistorted output regardless of the degree of limiting.

The novel features of the invention are set forth with particularity in the appended claims and specifications and the invention will be best understood from a consideration of the following description when read in connection with the accompanying drawings, in which:

Figure 1:
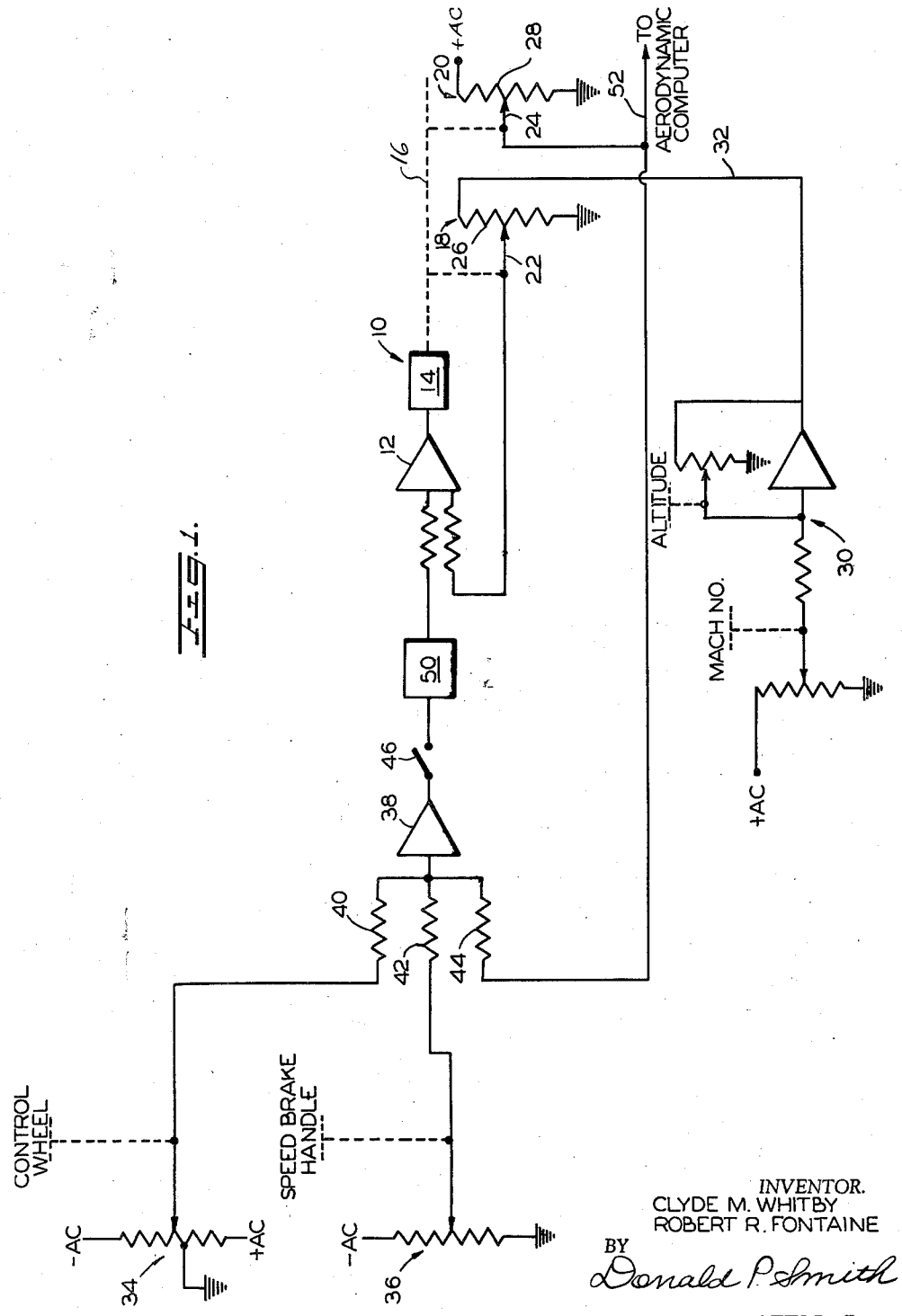
FIG. 1 is a schematic wiring diagram of a flight simulator showing the preferred setting of the invention.
Figure 3:
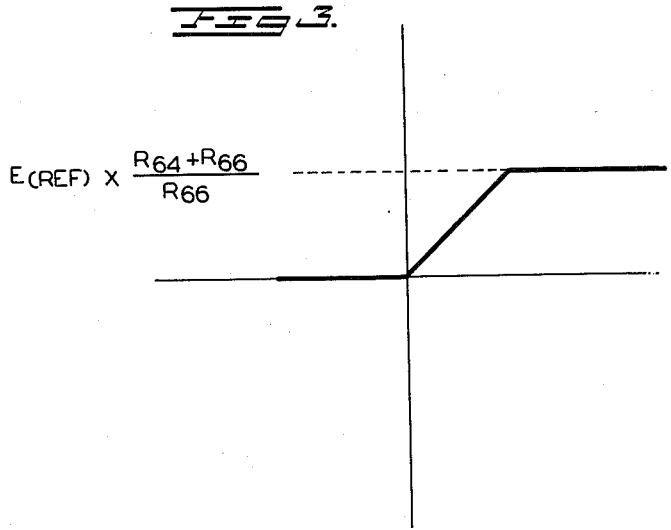
FIG. 3 is a curve showing the output characteristics of the circuit of FIG. 2.

Referring now to FIG. 1 of the drawing, reference character 10 designates generally a servo mechanism of the type described and explained in FIG. 3 of patent application by Charles L. Cohen and Robert A. Atchison, Ser. No. 717,933 filed on February 27, 1958, and assigned to the assignee of the present invention, the disclosure of which is incorporated herein. The servo mechanism here disclosed consists of an amplifier 12, a servo motor 14 and a shaft 16 having potentiometers 18 and 20 with wiper arms 22 and 24 mechanically connected to shaft 16, and resistance windings 26 and 28 energized from separate sources for purposes that will later be more fully explained. Mach number and altitude computers designated generally by reference character 30 of prior art type are connected to winding 26 of potentiometer 18 by conductor 32. A control wheel and a speed brake handle shown schematically are within the simulated cockpit and are available for manipulation by the student pilot. Motion of these controls by the pilot derives respective voltages from potentiometers designated by reference characters 34 and 36, each being connected to the input of summing amplifier 38 through scaling resistors 40 and 42. Voltage derived from potentiometer 20 is connected to the input of amplifier 38 through scaling resistor 44. A switch 46 is available to the student pilot to simulate turning the hydraulic system on for spoiler operation.

A phase selector and limiter circuit designated by reference character 50 is connected between the manually operated switch 46 and the input of servo amplifier 12 as there shown. The details of the circuit will be later explained in connection with the wiring diagram of FIG. 2 and the characteristic curve of FIG. 3. Switch 46 is normally on and when the student pilot desires spoiler action he actuates the speed brake handle or turns the control wheel, thus deriving voltages from potentiometers 34 or 36 which are impressed through scaling resistors 40 and 42 through amplifier 38, switch 46, phase selector circuit 50 to the input of amplifier 12, which drives motor shaft 16 to a position corresponding to the magnitude of the derived voltages and the position thereof represents the position of the spoilers. Potentiometer 20, in the usual way, derives an answer voltage from wiper arm 24 which is returned as feedback to the scaling resistor 44 of amplifier 38 to reduce the input voltages from potentiometers 34 and 36 so that the net input into amplifier 38 is zero whereby the motor 14 stops at a position corresponding to the magnitude of the initially derived voltages. This is the well known servo mechanism action, and voltage from potentiometer 20 is taken through conductor 52 to the aerodynamic computer where it is used to operate indicating devices and to compute flight rates during the course of the simulated flight.

If now the simulated speed of flight increases, and the altitude is not so high as to be in a region of very low air density, then a voltage is derived from computer 30 which is impressed upon winding 26 and impressed on the input of amplifier 12, this voltage being of such a sense and magnitude as to reverse the direction of motion of shaft 16 thereby simulating the condition of spoiler blowdown. Potentiometer 20 will simultaneously derive a new answer voltage in a sense which when connected to scaling resistor 44 tends to reverse the direction of motion of shaft 16. This voltage can acquire a very high value, but since in the actual aircraft the restoring force of a hydraulic system is limited in capacity so must the value of the restoring force from potentiometer 20 be limited.

Figure 2:
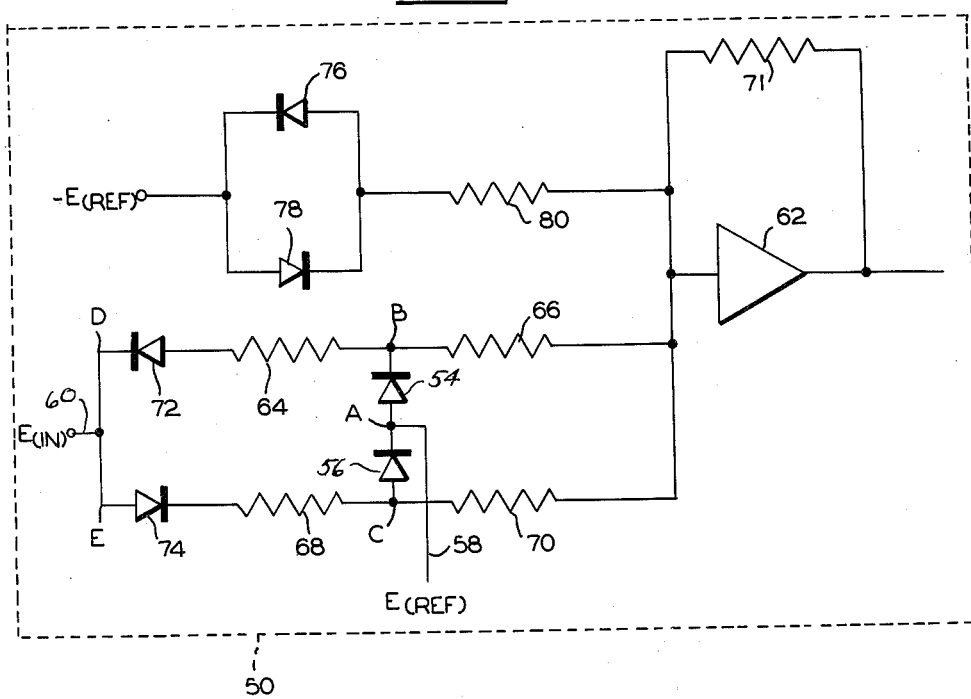
FIG. 2 is a schematic diagram showing the details of the phase selector and limiter circuit.

The circuit of FIG. 2 is depended upon to pass to its output circuit voltages of selected phase and predetermined magnitude, as illustrated by its output characteristic shown in FIG. 3. In the actual aircraft the hydraulic system has no characteristic which a negative phase would represent, therefore, only a positive phase may be passed on to the servo mechanism 10 in the simulated system. The circuit of FIG. 2 uses a series of unilateral impedance devices or diodes to select a predetermined phase of an A.C. voltage and to limit the amplitude thereof to a maximum value as predetermined by a reference voltage and as modified by the values of the voltage dividers used in the circuit. The circuit consists of a pair of diodes 54 and 56 connected in series so that one offers a high impedance to the positive cycle and the other offers a low impedance to the positive cycle of an alternating current reference voltage connected at their junction, as by conductor 58. An input circuit 60 and an output circuit comprising a feedback type amplifier 62 is provided, and they are interconnected by a pair of parallel connected voltage divider circuits comprising resistors 64, 66, 68 and 70 together with diodes 72 and 74. One of the extreme terminals of the first mentioned series connected diodes is connected into each voltage divider circuit. A reference voltage of a phase relationship in opposition to the reference voltage applied through conductor 58 is connected through diode pair 76 and 78 and input resistor 80 to the input of amplifier 62. The purpose of this reference voltage is to cancel the effect of the first mentioned reference voltage from the output of the circuit, and the diodes 76 and 78 are used to reduce distortion of the wave form near the crossover point of the curve due to the non-linearity of the diodes at low voltages.

If the input voltage is the same phase as $E_{REF}$ and lower in magnitude than $$E_{REF} \times \frac{R64+R66}{R66}$$

then during the positive half cycle circuit point A is more positive than circuit point C and diode 56 is a high impedance because of the back biasing by the reference voltage. Diode 74 is a low impedance to current flowing from circuit point E to circuit point C, and resistors 68 and 70 are chosen to be high impedances with respect to the forward impedance of diode 74 (that is, the impedance to currents flowing from E to C). Also, resistors 68 and 70 have low impedances with respect to the reverse impedance of the diodes. Since diode 56 is a high impedance and diode 74 is a low impedance during this positive half cycle $E_{IN}$ is applied directly to the input of a summing amplifier through resistor 70.

The greatest magnitude of voltage that can appear at the input of the summing amplifier is:

$$E_{REF} \times \frac{R64+R66}{R66}$$

Since it is assumed that the magnitude of $E_{REF}$ is greater than this value during the positive half cycle, diode 54 will have a low impedance and circuit point B will be at the same voltage level as circuit point A, thus $E_{REF}$ is applied to the input of an amplifier through resistance 66. Resistor 80 and the negative reference voltage are chosen so that this voltage is the same as the voltage applied at point A but in an opposite sense. Thus, the two reference voltages cancel one another at the input of the amplifier and do not appear at the output.

During the negative half cycle the action of diodes 54 and 72 is the same as the action of diodes 74 and 56 explained above, therefore, the input voltage is applied directly to the input of amplifier 62 through resistors 64 and 66 and $E_{REF}$ is applied to the input of amplifier 62 through resistor 70. If the magnitude of the input voltage exceeds:

$$E_{REF} \times \frac{R68+R70}{R70}$$

during the positive half cycle, circuit point E tends to be at a higher potential than circuit point C, thus, diode 74 conducts readily tending to make point C at a high potential than point A. Also, diode 56 conducts (because the potential at C is higher than at A) so that circuit point C cannot be at a higher voltage than the reference voltage. It will be understood that there is a connection, for example to ground, between the source of input voltage to conductor 60 and the source of reference voltage connected to conductor 58 so that when diode 56 conducts the current passes through conductor 58 back to ground and does not appear at the input of amplifier 62; thus, any voltage input higher than $$E_{REF} \times \frac{R68+R70}{R70}$$

cannot be applied at the input to the amplifier. During the negative half cycle diodes 72 and 54 conduct because point B is at a lower voltage than point A, thus bringing point B only down to the voltage level of minus $E_{REF}$ in the same manner that point C was brought to the positive reference during that cycle.

It will further be understood that the output voltage can be made equal to the input voltage by setting the transfer gain of amplifier 62 equal to unity. This is done by setting the value of the feedback resistor 71 to $R68+R70$.

If the input voltage is in phase opposition from the reference voltage applied from conductor 58 during the positive half cycle, then circuit point E is at a positive potential when circuit point A is at a negative potential. Under this condition diode 56 conducts thus bringing circuit point C to the same potential as point A. Also, circuit point D is positive when circuit points A and B are negative so that diode 72 will not conduct. Thus, the input voltage can have no effect on the output when it is of opposite phase to $E_{REF}$.

The characteristic curve of this circuit is shown in FIG. 3 where the selected phase in accordance with the reference voltage is there shown and the magnitude of the voltage is set forth in the relationship of the resistances of the voltage divider circuit.

Referring back now to FIG. 1, it will be seen that the phase selector and limiting circuit when connected to switch 46 passes only voltages of a magnitude predetermined by the size of the reference voltage and of a phase also predetermined by the sense of the reference voltage to the input of amplifier 12 thereby simulating a hydraulic blowdown recovery cycle from a hydraulic system of limited capacity.

Figure 4:
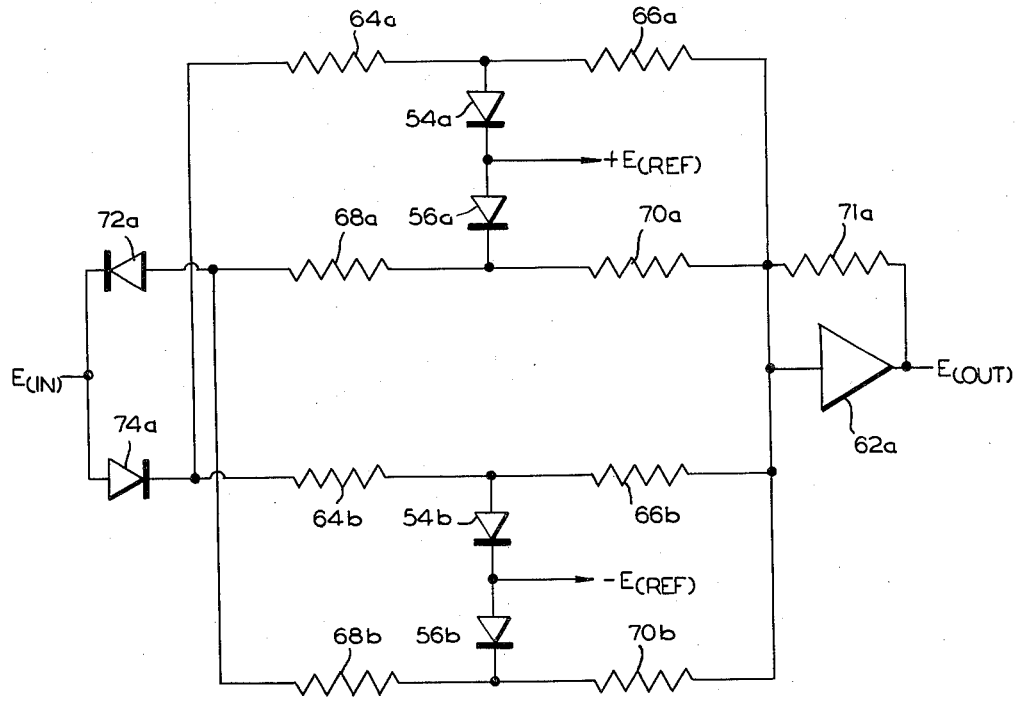
FIG. 4 is a schematic wiring diagram of a modification of the phase selector circuit of FIG. 2; and, FIG. 5 is a curve showing the output characteristics of the circuit of FIG. 4.
Figure 5:
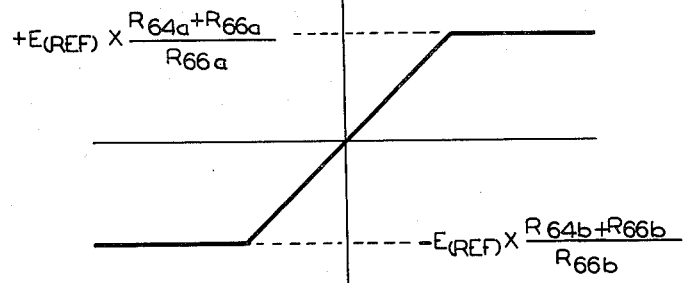

Attention is now directed to FIG. 4 which shows a phase selector and limiter circuit where both phases are passed to the input of feedback amplifier 62a and the magnitude of the output voltage is again limited to the ratio of the several values of resistances in a divider circuit. Here the circuitry is identical to that of FIG. 2 except that it is duplicated, one network being provided for each phase and the several circuit parameters carry the same reference characters as given FIG. 2 except the subscripts *a* and *b* are used to distinguish therebetween. The operation of this circuit is identical to that of the operation of the FIG. 2 circuit except that, as previously mentioned, both phases are passed to the output, and the characteristic curve is illustrated in FIG. 5.

A distinct advantage of this limiter over other clipping type limiters, is that the output wave form is undistorted regardless of the degree of limiting. This is true because during any one half cycle the reference sinusoidal voltage is continuously subtracted from the input sinusoidal voltage while limiting, thus producing a difference voltage on the grid which is the same wave form as the input.

It will be apparent to those skilled in the art that many parts of this invention may be used in conjunction with other types of grounded aviation trainers and that many changes may be made from the disclosed arrangement of this invention without departing from the substance thereof as covered by the following claims:

What is claimed is:

1. A circuit to derive a voltage proportional to the position of simulated spoilers for use in computing areodynamic characteristics in a grounded aircraft trainer of the type having a computer for deriving voltages proportional to functions of simulated Mach number and altitude and having control wheel and speed brake handle computers for manipulation by a trainee comprising in combination, a servo having an amplifier and a motor with a shaft movable to a position representing the position of the simulated spoilers, a first potentiometer having a wiper arm mechanically connected to the servo shaft to derive a voltage proportional to the position thereof, a second potentiometer having a winding energized by the voltages proportional to Mach number and altitude and having a wiper arm mechanically connected to the servo shaft and electrically connected to the servo amplifier, an input circuit connected to the control wheel and speed brake handle computers and to the wiper arm of said first potentiometer, and a phase selector and limiter circuit connected between the said input circuit and the said servo amplifier to predetermine the sense and magnitude of the input to the servo amplifier.

2. The invention as set forth in claim 1 wherein the said selector and limiter circuit comprises a phase selector and limiter circuit which includes an input circuit, a first pair of diodes connected in series, said input circuit connected to the common junction between said first diode pair, an output amplifier of the feedback type, a pair of voltage divider circuits each including a resistor pair, each of said divider circuits connected in parallel between a respective extreme terminal of said pair of diodes and said output amplifier, a second pair of diodes connected in series, respective extreme terminals connected between the resistor pair in each divider circuit, a reference voltage source connected to the common junction between said second diode pair, said four diodes and the included resistors forming a closed loop unidirectional current path.

3. A phase selector and limiter circuit for producing an alternating voltage output having a phase in accordance with the phase of an alternating reference voltage and having a magnitude not greater than the magnitude of the reference voltage comprising in combination an alternating current input circuit, a first pair of diodes connected in series, said input circuit being connected to the common junction between said first diode pair, an output amplifier of the feedback type, a pair of voltage divider circuits each including a resistor pair, each of said divider circuits being connected in parallel between a respective extreme terminal of said first pair of diodes and said output amplifier, a second pair of diodes connected in series having one of its respective extreme terminals connected between the resistor pair in each divider circuit, a source of alternating reference voltage of predetermined phase and magnitude connected to the junction between said second diode pair, said four diodes and the included resistors being connected in series in a closed loop with the anode of each diode connected to the cathode of the next to form a unidirectional current path.

4. The invention as set forth in claim 3 including a second source of alternating voltage equal in magnitude and opposite in phase to the said reference voltage connected to the output circuit to cancel the first recited reference voltage from the output.

5. A circuit to derive a voltage proportional to the position of simulated spoilers for use in computing aerodynamic characteristics in a grounded aircraft trainer of the type having a computer for deriving voltages proportional to functions of simulated Mach number and altitude and having control wheel and speed brake handle computers for manipulation by a trainee comprising in combination a servo having an amplifier and a motor with shaft movable to a position representing the position of the stimulated spoilers, a first poptentiometer having a wiper arm mechanically connected to the servo shaft to derive a voltage proportional to the position thereof, a second potentiometer having a winding connected to the Mach number and altitude computers and a wiper arm driven by the servo shaft and connected to the servo amplifier to derive a voltage tending to move the shaft in a simulated blow-down position at simulated high speed, an input circuit connected to the control wheel and speed brake handle computers and to the wiper arm of said potentiometer, and a phase selector and limiter circuit connected between said input circuit and the said servo amplifier to predetermine the sense and magnitude of the input of the servo amplifier, said last recited circuit comprising an input circuit, a first pair of diodes connected in series, said input circuit connected to the common junction between said first diode pair, an output amplifier, a pair of voltage divider circuits, each of said divider circuits connected in parallel between a respective extreme terminal of said first pair of diodes and said output amplifier, a second pair of diodes connected in series having one of its respective extreme terminals connected in each divider circuit, and a reference voltage source connected to the common junction between said second diode pair, said four diodes and the included divider circuit portion forming a closed loop unidirectional current path.

6. A circuit to derive a voltage proportional to the position of simulated spoilers for use in computing aerodynamic characteristics in a grounded aircraft trainer of the type having a computer for deriving voltages proportional to functions of simulated Mach number, and altitude, and having control wheel and speed brake wheel handle computers for manipulation by a trainee, comprising in combination a servo having an amplifier and a motor with a shaft movable to a position representing the position of the simulated spoilers, a first potentiometer having a wiper arm mechanically connected to the servo shaft to derive a voltage proportional to the position thereof, a second ppotentiometer having a winding connected to the Mach number and altitude computers, and having a wiper arm mechanically joined to the servo shaft and electrically connected to the servo amplifier, an input circuit connected to the control wheel and speed brake handle computers and to the wiper arm of said first potentiometer to algebraically add the voltages therefrom, and a phase selector and limiter circuit connected between said input circuit and said servo amplifier to predetermine the sense and magnitude of the input to the servo amplifier, said last recited circuit comprising an input circuit, a first pair of diodes connected in series, said input circuit connected to the common junction between said first diode pair, an output amplifier of the feedback type, a pair of voltage divider circuits each including a resistor pair, each of said divider circuits connected in parallel between a respective extreme terminal of said first pair of diodes and said output amplifier, a second pair of diodes connected in series having one of its respective extreme terminals connected in each divider circuit, a reference voltage source connected to the common junction between said second diode pair, said four diodes and the included resistors forming a closed loop unidirectional current path, and a second source of reference voltage in phase opposition to said first recited source of reference voltage connected to the output amplifier.

References Cited in the file of this patent

UNITED STATES PATENTS

| | | |
|---|---|---|
| 2,510,500 | Hayes et al. | June 6, 1950 |
| 2,842,664 | Martin | July 8, 1958 |

OTHER REFERENCES

Electronics (Publ.), Feb. 1954, pages 186, 187.

"Electric Analog Computers" (second edition), Korn and Korn, published by McGraw-Hill Book Co. (1956), page 83, FIGS. 3, 3f.